United States Patent [19]

Nakajima

[11] 3,821,791

[45] June 28, 1974

[54] WHITE BALANCE CONTROL SYSTEM

[75] Inventor: Kazuhiko Nakajima, Yokohama, Japan

[73] Assignee: Sony Corporation, Tokyo, Japan

[22] Filed: Mar. 21, 1972

[21] Appl. No.: 236,715

[30] Foreign Application Priority Data

Mar. 23, 1971 Japan ................................ 46/16715

[52] U.S. Cl. ............................................ 178/5.4 BT

[51] Int. Cl. ............................................ H04n 9/04

[58] Field of Search.... 178/5.4 AC, 5.4 ML, 5.4 W, 178/5.4 ST, 5.4 R, 5.4 AC, 5.2 R, 5.2 A, DIG. 26, 5.4 BT

[56] References Cited

UNITED STATES PATENTS

| | | | |
|---|---|---|---|
| 3,272,916 | 9/1966 | James et al. | 178/5.4 R |
| 3,437,745 | 4/1969 | Haferl | 178/5.4 R |
| 3,548,083 | 12/1970 | Cahen | 178/5.4 R |
| 3,627,911 | 12/1971 | Kubota | 178/5.4 |

*Primary Examiner*—Robert L. Richardson
*Assistant Examiner*—Marc E. Bookbinder
*Attorney, Agent, or Firm*—Lewis H. Eslinger et al.

[57] ABSTRACT

A white balance system for a color television camera in which a plurality of adjustable potentiometers are connected in parallel across the output load of a transistorized phase splitting circuit fed by a delayed form of the luminance signal. The movable contacts of the potentiometers are separately connected to the fixed contacts of a pair of rotary switches whose movable contacts are ganged. The movable switch contacts are separately connected through adding circuits to the color demodulator circuit of the camera so that the signals appearing at the movable contacts of a selected pair of the potentiometers are combined with the color difference signals. The settings of the potentiometers compensate for predetermined levels of illumination to produce a properly white balanced chrominance signal.

3 Claims, 17 Drawing Figures

WHITE BALANCE CONTROL SYSTEM

BACKGROUND OF THE INVENTION

The invention relates to a white balance control system and more particularly to a system for easily and accruately controlling the white balance of the color video signal of a television camera.

Even if a normal color television camera is adjusted to obtain a good white balanced color video signal or chrominance signal in a television studio using a standard illumination, for example an illumination having a color temperature of 3,000° K, its white balance is lost when the camera is moved to the outdoors. As a result, an image reproduced from the signal looks pale.

To adjust the white balance of prior art television cameras, an optical filter for a particular color temperature correction is sometimes used. Different filters are exchanged in accordance with the color temperature of the illumination used. The handling and operation of such filters is troublesome and time consuming.

Some prior color television cameras employ a color separation filter for producing a composite video signal of a chrominance signal and a luminance signal directly from a single image pickup tube. In such cameras the lack of uniformity of the color separation characteristics of the color filter or the unequal width of each color filter stripe element causes loss of the white balance of the chrominance signal, so that the reproduced image looks pale.

It is the practice in still other prior art systems while televising a white object to control the gains of gain control circuits provided in all or in two of the amplifiers for the red, green and blue video signals in a manner to retain the signals at substantially the same level. However, control of each color exerts an influence upon the balance of the other two colors, so that accurate adjustment of the white balance is difficult and the operation therefore is troublesome.

SUMMARY OF THE INVENTION

The above and other disadvantages are overcome by a preferred embodiment of the present invention of a white balance control system for use with a color television camera of the type producing a composite signal of a luminance signal (Y) and a chrominance signal representative of at least a red color video signal (R) and a blue color video signal (B), the control system comprising means responsive to the composite signal for separating out the chrominance and luminance signals and for producing at least two sets of color difference signals representative of the difference between the red color video signal and the luminance signal (R-Y) and the difference between the blue color video signal and the luminance signal (B-Y) and means responsive to the luminance signal for selectively adding signals representative of the luminance signal to each set of the color difference signals, the added signals having predetermined polarities and levels to compensate for changes in the levels and polarities of the color difference signals due to a change in the color temperature of the illumination used in conjunction with the color television camera whereby the white balance of the chrominance signal is restored.

It is therefore one object of the invention to provide a white balance control system for correcting the loss of white balance of the chrominance signal obtained from a color television camera due to a change of the color temperature of the illumination of the object or due to the use of an optical filter.

It is another object of the invention to provide a system for obtaining a white balanced NTSC signal from a color television camera having one image pickup tube.

The above, and other objects, features and advantages of this invention, will be more readily understood upon consideration of the following detailed description of certain preferred embodiments of the invention, taken in connection with the accompanying drawings.

DETAILED DESCRIPTION OF CERTAIN PREFERRED EMBODIMENTS

Figure 1:
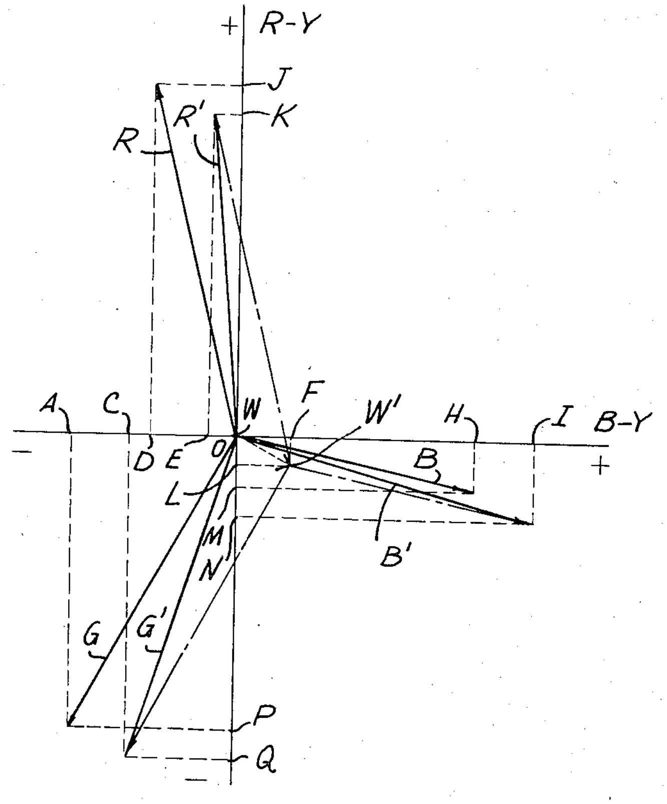
FIG. 1 is a vector diagram of the color video signals illustrating a white balanced system (solid line) and the system when it is not white balanced (dot dash lines)
Figure 3:
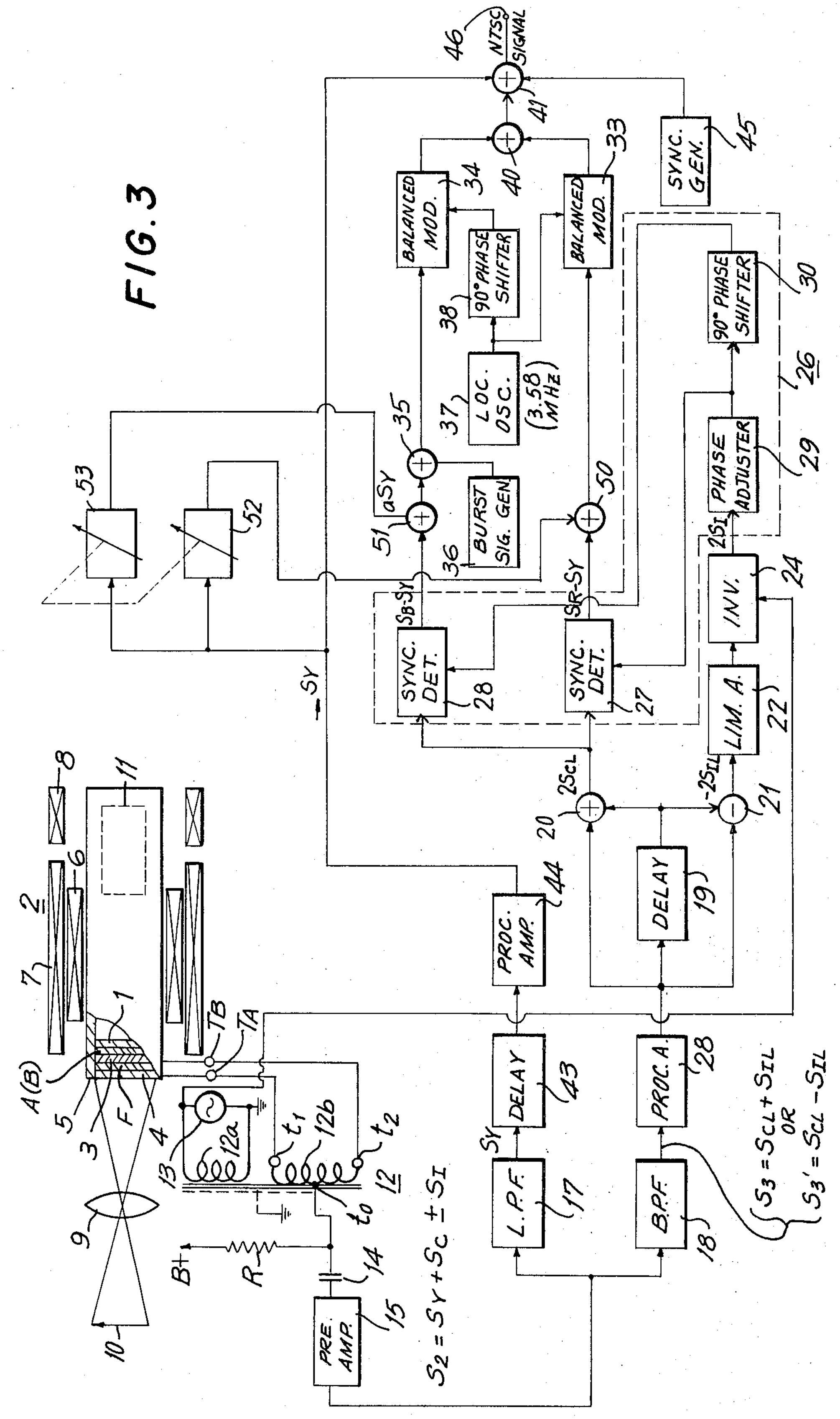
FIG. 3 is a system diagram illustrating the present invention in conjunction with a suitable image pickup device.

Referring now to FIGS. 1 and 3 the effect of a shift in the white balance on the color video signals due to a change in the source of illumination will be explained. As will be described in greater detail below in reference to FIG. 3, the camera 2 and its supporting circuitry produce a luminance signal (Y) and a chrominance signal representative of at least two color video signals, namely a red (R) and a blue (B) signal. The circuit further comprises a demodulator for producing color difference signals R-Y and B-Y representative of the difference between the red and blue color video signals and the luminance signal, respectively.

If the optical filter F of the camera 2 is designed to produce a good white balanced picture under standard, studio illumination having a color temperature of 3,000° K, then when the camera is taken outdoors under sunlight having a color temperature of about 14,000° K, the output signals of the color demodulator circuit, that is, color difference signals will be changed and the image reproduced from the signals will appear pale.

The axes (B-Y) and (R-Y) in FIG. 1 show the axes of color demodulation of the blue color difference signal and the red color difference signal, respectively. Three primary color signals $S_R$, $S_G$, $S_B$ representative of an object viewed by the camera 2 under an illumination having a color temperature of 3,000° K are represented by the vectors R, G, B, respectively, having their origin coincident with the origin 0 of the axes (B-Y) and (R-Y). The sum of the vectors R, B and G is a vector W (having no length) representing the color white and having its origin at 0.

If the illumination is changed to sunlight having a color temperature of about 14,000° K, the vector representing white color W will shift to become the vector W' having a length W'. The three primary color vectors R, G, B will all be shifted in parallel by the amount of the vector W' respectively. Accordingly the resultant, shifted vectors are represented R', G', and B' respectively. When these signals are to be demodulated with respect to the axes (R-Y) and (B-Y), the white balance of these signals will be changed.

Figures 2A, 2B:
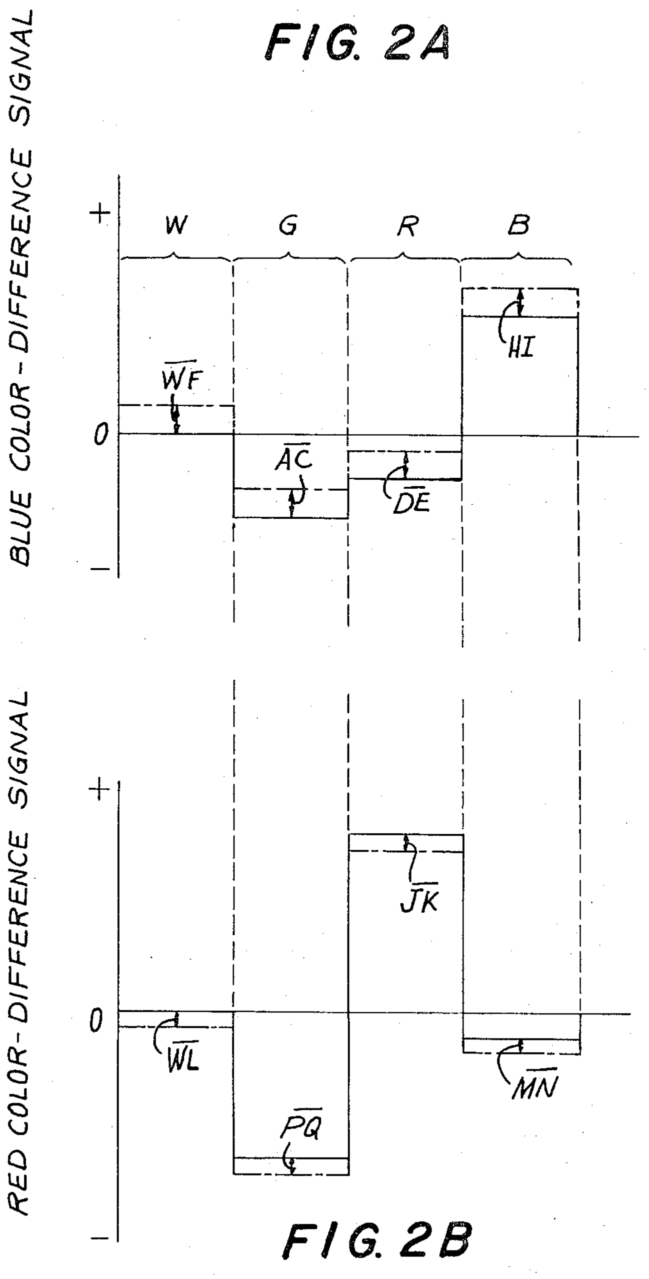
FIGS. 2A and 2B are graphs illustrating the color difference signal outputs produced by the present invention.

The demodulated color difference signals are illustrated in FIGS. 2A and 2B. The solid lines in FIG. 2A represent the demodulated blue color-difference signal which are derived from a synchronous detector for the blue color difference signal (designated 28 in FIG. 3). The demodulated blue color difference signals correspond to the original primary color signals, that is, the red signal $S_R$, the green signal $S_G$, and the blue signal $S_B$. The dot dash lines in FIG. 2A represent the demodulated blue color difference signals corresponding to the shifted primary color signals $S_R'$, $S_G'$, and $S_B'$. Similarly, in FIG. 2B, the solid lines represent the demodulated red color difference signals corresponding to the original color signals $S_R$, $S_G$, $S_B$ and the dot dash lines represent the shifted color signals $S_R'$, $S_G'$, $S_B'$.

In FIG. 2A the amount WF of the blue color difference signal corresponds to the B-Y component of the white color signal vector W'. The other amounts AC, DE, etc., similarly represent the amount of shift of the original demodulated signals. Each amount AC, DE, etc., appears on the axes (B-Y) or (R-Y) in FIG. 1.

In order to compensate for the shift of the demodulated color-difference signals, a signal which has the level of WF and has negative polarity may be added to the output signal of the synchronous detector 28 for the blue color difference signal. It should be noted that the amount WF equals AC or DE or H1 since the B-Y components of the green, the red, and the blue color signals were shifted by equal amounts. Similarly, a signal having a level of WL and a positive polarity, may be added to the demodulated red color difference signals. The net result with respect to FIG. 1 is to subtract the vector W' from the shifted color signals to restore them to their original position on the R-Y, B-Y axis and thus to restore the proper white balance.

According to the present invention these added signals having amounts of −WF and +WL are derived from the luminance signal to restore the white balance. One advantage of using the luminance signal as the source for the added signals is that while the output difference of each color difference signal changes according to the motion of the observed object, the added signals from the luminance signal are also correspondingly changed.

Figure 4:
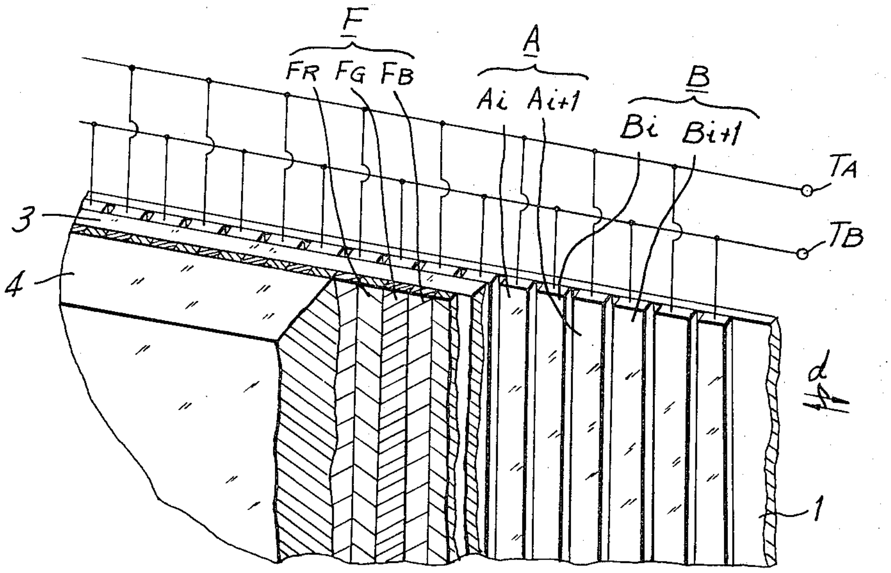
FIG. 4 is a perspective view showing a fragment of the principal part of an image pickup tube employed in the image pickup device in FIG. 3.

Referring now particularly to FIGS. 3 and 4 a description will be given first of a suitable image pickup tube for use with the invention. The target end of the tube is shown in FIG. 4 and comprises a plurality of sets of nesa electrodes $A_1$, $B_1$, . . . $A_n$, $B_n$ having a predetermined width of, for example, 30 microns interleaved in a repeating cyclic order at predetermined intervals of, for example, 5 microns on a photoelectric conversion layer 1, such as a photoconductive layer of antimony trisulfide, which is scanned by an electron beam. The electrodes $A_1$, . . . $A_n$ and $B_1$, . . . $B_n$ are indicated as electrodes A and B, respectively. In this case, these electrodes A and B are arranged so that their longitudinal directions are different from the electron beam horizontal scanning direction, which is indicated by an arrow *d*. In the example shown, the electron beam horizontal scanning direction *d* and the longitudinal directions of the electrodes A and B are perpendicular to each other. The electrodes A and B are connected together in two groups to signal output terminals $T_A$ and $T_B$, respectively. The electrodes A and B are formed on a transparent, protective, insulating plate, for example a glass plate, 3 on which the photoelectric conversion layer 1 is formed. On the other side of the glass plate 3 is disposed an optical filter F which consists of red, green, and blue optical strip filter elements $F_R$, $F_G$, and $F_B$ of a predetermined width which are sequentially arranged at predetermined intervals in a repeating cyclic order $F_R$, $F_G$, $F_B$, $F_R$, $F_G$, $F_B$, . . . so arranged that each triad of red, green, and blue optical strip filter elements may be opposite to one pair of adjacent electrodes $A_i$ and $B_i$ of the aforementioned electrodes A and B. The arrangement is such that the longitudinal directions of the strip filter elements agree with those of the electrodes A and B. A faceplate glass 4 covers the optical filter F.

The photoelectric conversion layer 1, the electrodes A and B, the glass plate 3, the optical filter F and the faceplate glass 4 are combined in a disc-like configuration having a diameter of 2.54 cm., for example, and attached to one end of a pickup tube envelope 5 shown in FIG. 1. The tube envelope 5 has a deflection coil 6, a focusing coil 7, and an alignment coil 8 mounted thereon. Reference numeral 9 indicates a camera lens by means of which rays of light from an object 10 that is to be televised enter the tube envelope 5 through the faceplate 4 and are focused on the photoelectric conversion layer 1. Reference numeral 11 designates an electron gun.

Figure 5:
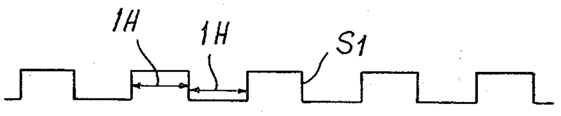
FIGS. 5, FIGS. 6A, 6A', 6B, 6B', 6C, 6C', 6D–6F, inclusive, are waveform diagrams for use in explaining the operation of the color image pickup device of FIG. 3.

During operation of the pickup device, an alternating signal $S_1$, shown in FIG. 5, is supplied to the electrodes A and B. For example, a transformer 12 may be provided, and the ends $t_1$ and $t_2$ of its secondary winding 12*b* connected to the signal output terminals $T_A$ and $T_B$, respectively. A signal source 13 is provided for generating the alternating signal $S_1$, which is synchronized with the horizontal scanning period of an electron beam on the photoelectric conversion layer 1, and the signal source is connected to a primary winding 12*a* of the transformer 12. The alternating signal $S_1$ is a rectangular wave which has a pulse width 1H equal to the electron beam horizontal scanning period H. For the NTSC system, this is a pulse width of 63.5 sec. The signal $S_1$ has a repetition rate of one half of the horizontal scanning frequency, which is 15.75/2 KHz for an NTSC system.

Such an alternating signal $S_1$ may be produced by making use of a pulse signal derived from the DC-DC converter of a high voltage generator circuit, for example. Such DC-DC converters are well-known and need not be described here. The center tap $t_0$ of the secondary winding 12*b* of the transformer 12 is connected to the input side of a preamplifier 15 through a capacitor 14, and a DC power source of, for example, 10 to 50V is connected to the center tap $t_0$ of the secondary winding 12*b* through a resistor R.

In other embodiments, instead of providing a transformer 12, resistors are connected in series between the terminals $T_A$ and $T_B$ and their connection point is connected to the input terminal of the preamplifier 15 through a capacitor and the aforementioned rectangular wave is supplied to the electrodes A and B through capacitors.

Figure 6A:
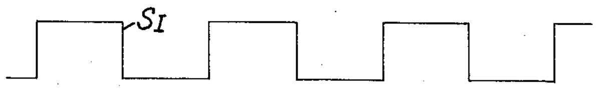
Figure 6A:
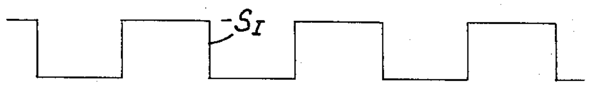

With the arrangement shown in FIG. 3 the electrodes A and B are supplied with a superimposed voltage consisting of the voltage derived from the DC power source B+ and the signal $S_1$ shown in FIG. 5. Thus the electrodes A and B are alternately supplied with voltages that are higher and lower than the DC bias voltage for every horizontal scanning period, so that a striped potential pattern corresponding to the electrodes A and B is formed on the surface of the photoconductive layer 1. When no light from the object 10 is incident on the image pickup tube 2 during the horizontal scanning period $H_i$, a rectangular wave signal $S_I$, such as shown in FIG. 6A, is derived at the input side of the preamplifier 15 from the center tap $t_o$ due to electron beam scanning in a given period $H_i$.

Figure 6B:
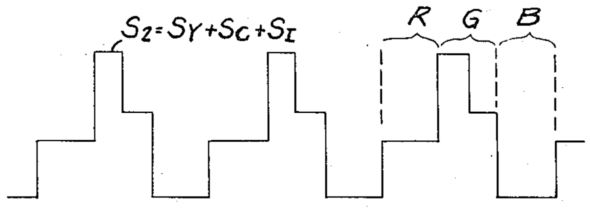
Figure 6B:
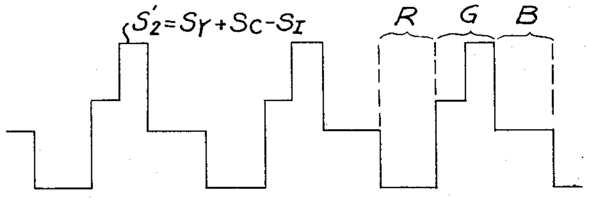

This signal $S_I$ serves as an index signal, the frequency of which is determined by the widths and spacings of the electrodes A and B and by the time required for one horizontal scanning period of the electron beam. In this case, the frequency of the index signal $S_I$ is set at, for example, 3.58 MHz. Then, when rays of light from the object 10 are focused on the photoelectric conversion layer 1, a signal corresponding to the color-separated image on the photoelectric conversion layer 1 is superimposed on the index signal $S_I$ to provide a composite signal $S_2$, such as depicted in FIG. 6B. In the figure those portions of the composite signal $S_2$ which correspond to the red, green, and blue colored light are marked with R, G, and B, respectively.

Figure 7:
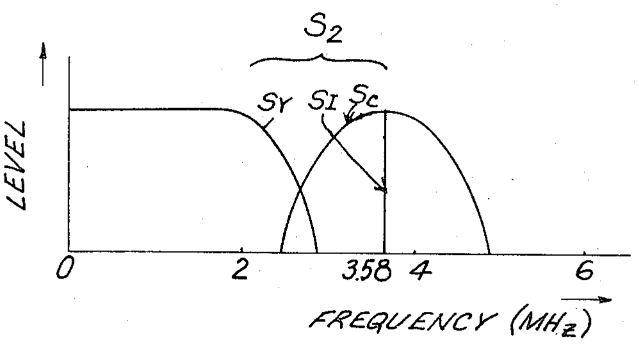
FIG. 7 is a graph illustrating one example of the frequency spectrum of a composite color signal obtainable with the color image pickup device of FIG. 3.

The composite signal $S_2$ is expressed by the sum of a luminance signal $S_Y$, a carrier color, or chrominance, signal $S_C$ and the index signal $S_I$, namely $S_2 = S_Y + S_C + S_I$. The frequency spectrum of the composite signal $S_2$ is determined, for example, as depicted in FIG. 7, considering the widths and spacings of the electrodes A and B and the strip filter elements $F_R$, $F_G$, and $F_B$ of the optical filter F and the horizontal scanning period. That is, the composite signal $S_2$ is positioned in a band of 6MHz as a whole. The luminance signal $S_Y$ occupies the lower frequency portion of this band, and the chrominance signal $S_C$ occupies the higher frequency portion. In this case, it is preferred to minimize the overlapping of the luminance signal $S_Y$ and the chrominance signal and, if necessary, resolution can be lowered a little by placing a lenticular lens in front of the image pickup tube 2 to narrow the band of the luminance signal $S_Y$.

In the subsequent horizontal scanning period $H_{i+1}$, the voltages (the alternating signal) fed to the electrodes A and B are reversed in phase. Accordingly, a resulting index signal $-S_I$, as shown in FIG. 6A', is produced. This index signal is opposite in phase to the index signal $S_I$ depicted in FIG. 6A. As a result of this, a composite signal $S_2'$ is derived at the input side of the preamplifier 15, as shown in FIG. 6B', namely $S_2' = S_Y + S_C - S_I$.

Figure 6C:
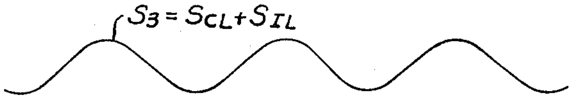
Figure 6C:

Such a composite signal $S_2$ (or $S_2'$) is supplied to the preamplifier 15 to be amplified and is then fed to a low-pass filter 17 and to a band-pass filter (or a high-pass filter) 18, respectively, thus deriving the luminance signal $S_Y$ from the low-pass filter 17 and a signal $S_3 = S_{CL} + S_{IL}$, such as is shown in FIG. 6C (or $S_3' = S_{CL} - S_{IL}$, such as is shown in FIG. 6C') from the band-pass filter 18. In this case, $S_{CL}$ and $S_{IL}$ are low-frequency components (fundamental wave components) of the chrominance signal SC and the index signal $S_I$, respectively.

Figure 6D:

The index signal $S_I$ and the chrominance signal $S_C$ have the same frequency, so that they cannot be separated by using a filter but can be separated in the following manner. The output of the filter 18 is connected through a process amplifier 28 to an adder 20 and to a delay circuit 19 which delays by one horizontal scanning period 1H the signal $S_3 = S_{CL} + S_{IL}$ (or $S_3' = S_{CL} - S_{IL}$). This delay circuit may be made up of a crystal, for example. The signal $S_3 = S_{CL} + S_{IL}$ (or $S_3' = S_{CL} - S_{IL}$) derived from the delay circuit 19 in the horizontal scanning period $H_i$ and the signal $S_3' = S_{CL} - S_{IL}$ (or $S_3 = S_{CL} + S_{IL}$) derived directly from the process amplifier 28 in the subsequent horizontal scanning period $H_{i+1}$ are added together in the adder circuit 20. In this case, the chrominance signal $S_C$ in adjacent horizontal scanning periods can be regarded as substantially the same, so that a carrier color signal $2S_{CL}$, such as is shown in FIG. 6D, is provided as the sum of the signals $S_3$ and $S_3'$.

Figure 6E:
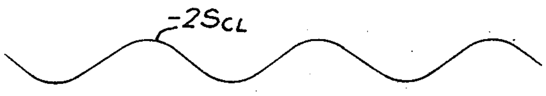
Figure 6F:
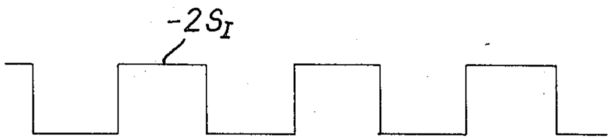

Further, the signals from the process amplifier 28 and the delay circuit 19 are supplied to a subtracting circuit 21. During one horizontal scanning interval, the output of the subtracting circuit is $S_3 - S_3'$, or $(S_{CL} + S_{IL}) - (S_{CL} - S_{IL}) = 2S_{IL}$. During the next scanning interval the output of the subtracting circuit is $S_3' - S_3$, or $(S_{CL} - S_{IL}) - (S_{CL} + S_{IL}) = -2S_{IL}$, as shown in FIG. 6E. The index signal $-2S_{IL}$ (or $2S_{IL}$) is fed to a limiter amplifier 22 to limit its amplitude to a constant value, thus providing an index signal $-2S_I$, such as depicted in FIG. 6F (or $2S_I$, not shown).

The output of the limiter 22 is connected to an inverter 24. The inverter 24 inverts the polarity of the input signal by line in synchronism with the alternating signal $S_1$ to produce an index signal $2S_I$ with constant polarity in any horizontal scanning period. The output of the inverter 24 is connected to a color demodulation circuit 26, shown encompassed by a dotted line. The demodulation circuit 26 includes two phase adjusters 29 and 30, a synchronous detector 27 for detecting a red color-difference signal $S_R - S_Y$ and a synchronous detector 28 for detecting a blue color-difference signal $S_B - S_Y$.

The index signal $2S_I$ derived from the inverter 24 is first supplied to the phase adjuster 29 to shift the phase of the signal to that of the red color-difference signal demodulation axis. The phase shifted output signal from the phase adjuster 29 is supplied to the synchronous detector 27 for the red color-difference signal ($S_R - S_Y$). A portion of the output signal from the phase adjuster 29 is also applied to the phase shifter 30 to shift the phase of the input signal by 90°. The 90° shifted signal is supplied to the synchronous detector 28 to detect the blue color-difference signal $S_B - S_Y$.

The detected color difference signals $S_R - S_Y$ and $S_B - S_Y$ from the detectors 27 and 28 are each supplied to balanced modulators 33 and 34, respectively. The blue color difference signal is provided through an adding circuit 35 with a burst-signal from a burst-signal generator 36. A local color subcarrier signal (3.58 MHz) generated by a local oscillator 37 for the color subcarrier is supplied to the balanced modulator 33. A portion of the subcarrier is also supplied to the other balanced modulator 34 through a 90° phase shifter 38.

The output signals of the balanced modulators 33 and 34 are summed up by an adding circuit 40. The output signal of the adding circuit 40, the luminance signal $S_Y$ derived from the low-pass filter through a delay line 43 and a process amplifier 44, and the horizontal and vertical synchronous signals derived from a synchronous signal generator 45 are all added together at an adding circuit 41 to produce an NTSC composite color video signal which is fed to a terminal 46.

According to the present invention, portions of the luminance signal $S_Y$ derived from the process amplifier 44 are supplied to two circuits 52 and 53 to selectively vary both the level (amplitude) and the polarity of the input luminance signal portions. The output signals of the varying means 52, 53 are combined with the color-difference signals $S_R - S_Y$, $S_B - S_Y$ through adding circuits 50 and 51, respectively. The polarity and the level of the luminance signal portions to be added to the color difference signals $S_R - S_Y$ and $S_B - S_Y$ is selected so that the white balance of the resultant composite color video signal produces a correct white balance.

Figure 8:
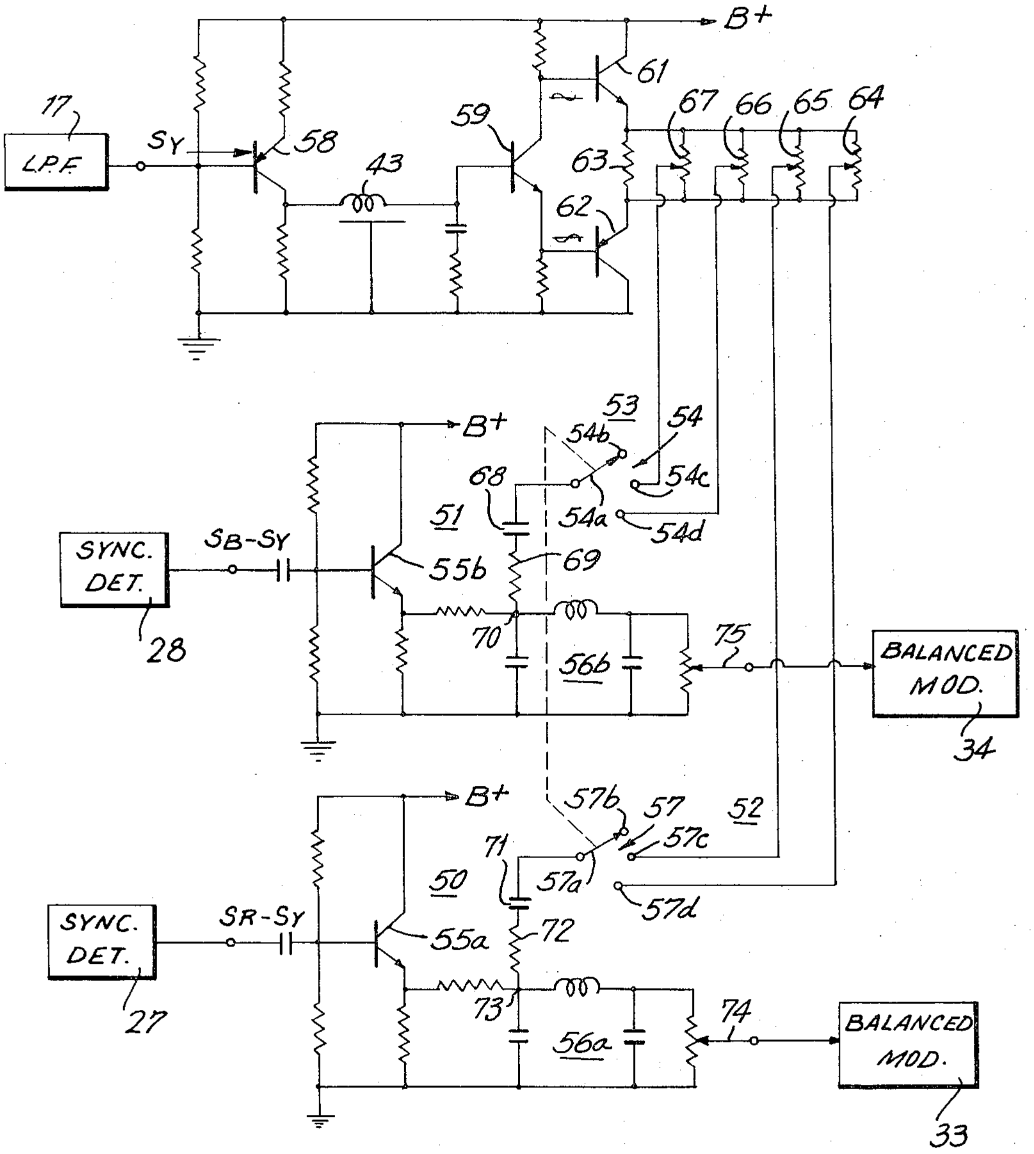
FIG. 8 is a schematic diagram for explaining the present invention.

A detailed description of the luminance signal portion adding circuits 50, 51 and the varying circuits 52, 53 will hereinafter be made referring particularly to FIG. 8.

The luminance signal adding circuit 50 comprises an NPN transistor 55*a* connected in a common collector (emitter follower) configuration. The red color-difference signal $S_R - S_Y$ derived from the synchronous detector 27 is supplied to the base of the transistor 55*a*. The output signal obtained at the emitter of the transistor 55*a* is supplied to the input terminal 73 of a low-pass filter 56*a*. The reference character B+ indicates the positive DC source (not shown) for the transistor 55*a*. As will be explained below, the portion of the luminance signal having a predetermined polarity and level obtained through the varying means 52 is also supplied to the input terminal 73 of the low-pass filter 56*a*.

The adding circuit 51 is similarly constructed and comprises an NPN transistor 55*b* connected in a common collector (emitter-follower) configuration. The color difference signal $S_B - S_Y$ is supplied to the base electrode of the transistor 55*b* from the synchronous detector 28. The output signal obtained at the emitter electrode of the transistor 55*b* is supplied together with the portion of the luminance signal varied in level and polarity by the varying circuit 53 to the input terminal 70 of a low-pass filter 56*b*. A detailed description of the emitter follower amplifiers 55*a* and 55*b* and the low-pass filters 56*a* and 56*b* has not been given since their construction is well-known in the art.

The luminance signal $S_Y$ is supplied from the low-pass filter 17 to the base of a PNP transistor 58 connected in a common emitter configuration. The output signal appearing at the collector electrode of the transistor 58 is supplied through the delay circuit 43 and the process amplifier 44 (not shown in FIG. 8 for purposes of brevity) to the base of an NPN transistor 59. The transistor 59 is connected in a phase splitting configuration and produces two oppositely phased signals at its collector and emitter electrodes. The collector electrode of the transistor 59 is connected to the base of an NPN-type transistor 61 and the emitter electrode of the transistor 59 is connected to the base of a PNP-type transistor 62.

The collector electrode of the transistor 61 is connected to a DC source B+ (not shown) and the collector of the transistor 62 is grounded. The emitter electrodes of the transistors 61 and 62 are connected to each other through a resistor 63. A plurality of potentiometers 64, 65, 66 and 67 are connected in parallel with the resistor 63. These potentiometers 64 through 67 each have a movable center contact and the resistivity between the center contact and either end of the potentiometer is variable. Since the potentiometers are connected in parallel across the resistor 63 they act as separate voltage dividers of the signal appearing across the resistor 63. At the midpoint of each potentiometer the output is null. As the contact goes upward, the level of the output luminance signal increases with a given polarity. As the movable contact goes downward, the level of the luminance signal increases but with the opposite polarity.

Rotary switches 54 and 57 are provided with respect to the luminance signal adding circuits 53 and 52, respectively. The switch 54 has a movable contact 54*a* and fixed contacts 54*b*, 54*c* and 54*d*. The contacts 54*c* and 54*d* are connected to the movable contacts of the potentiometers 67 and 66, respectively. The fixed contact 54*b* is unconnected. The movable contact 54*a* is connected to the input terminal 70 of the low-pass filter 56*b* through a capacitor 68 and resistor 69 connected in series. The output of the low-pass filter 56*b* is connected through a potentiometer 75 to the input of the balanced modulator 34.

The rotary switch 57 has a movable contact 57*a*, which is ganged with the movable contact 54*a*, and fixed contacts 57*b*, 57*c* and 57*d*. The contact 57*b* is unconnected and the contacts 57*c* and 57*d* are connected to the movable contacts of the potentiometers 65 and 64, respectively. The contact 57*a* is connected in series with a capacitor 71 and a resistor 72 to the input terminal 73 of the low-pass filter 56*a*. The output of the low-pass filter 56*a* is connected through a potentiometer 74 to the input of the balanced modulator 33.

Separate luminance signal portions with arbitrary levels and polarities can be obtained from the movable contacts of the potentiometers 64 through 67. The potentiometers are individually adjusted for a particular illumination to provide the proper level and polarity of a portion of the luminance signal which, when added to the color difference signals, will yield a proper white balanced chrominance signal.

In operation, a piece of white paper is observed under each illumination and the resistivities of a pair of the potentiometers corresponding to a setting of the switches 54 and 57 are adjusted until a proper white balance is obtained. Once the resistivities are set, the movable contacts 54*a* and 57*a* may be turned by the camera operator to a setting corresponding to a particular illumination. For example, if the camera is designed to give a good white balance under studio illumination of 3,000° K, and it is desired to observe an object illuminated at a color temperature of 14,000° K (sunlight), then the switches 54 and 57 are set with their movable contacts 54*a* and 57*a* connected to the fixed contacts 54*c* and 57*c*, respectively. The movable contacts of the potentiometers 67 and 65 are then adjusted to give a properly white balanced chrominance signal while the camera views a white reference. Thereafter the camera operator need only set the movable contacts 54*a* and 57*a* to connect to the fixed contacts 54*c* and 57 *c*, respectively, when the camera is observing an object illuminated by bright sunlight.

The other setting of the switches corresponding to the contacts 54*d* and 57*d* may similarly be made to provide proper portions of the luminance signal from the potentiometers 66 and 64, respectively, for another type of illumination. When the camera is viewing an object under studio illumination having a color temperature of 3,000° K then the movable switch contacts 54*a* and 57*a* would be set to connect with the fixed contacts 54*b* and 57*b*, respectively. The amplitude of the output signals from the low-pass filters 56*a* and 56*b* supplied to the balanced modulators 33 and 34 may be further adjusted by the potentiometers 74 and 75, respectively.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. In a color television camera of the type which produces a composite signal of a luminance signal (Y) and a chrominance signal representative of at least a red color video signal (R) and a blue color video signal (B), and wherein means responsive to the composite signal are provided for separating out the chrominance and luminance signals and for producing at least two sets of color difference signals representative of the difference between the red color video signal and the luminance signal (R-Y) and the difference between the blue color video signal and the luminance signal (B-Y), the two sets of color difference signals having a predetermined relation between them with regard to their amplitudes and polarities when the camera observes an object under an illumination of a predetermined color temperature, a white balance control system comprising means responsive to the luminance signal for selectively adding signals representative of the luminance signal to each set of the color difference signals when the camera views the object under an illumination having a different color temperature than the predetermined color temperature, including means for producing first and second signals, each representative of the luminance signal but having substantially opposite polarities and a plurality of means for combining the first and second signals in predetermined portions whose polarities and amplitudes are sufficient, when combined with the color difference signals to restore the predetermined relationship between the amplitudes and polarities of the color difference signals.

2. A white balance control system comprising means for generating at least a first and a second color video signal, means for generating a third video signal, means for producing a first color difference signal representative of the difference between the first color video signal and the third video signal, means for producing a second color difference signal representative of the difference between the second color video signal and the third video signal, means responsive to the third video signal for producing a plurality of signals having individually predetermined polarities and levels, and means for selectively adding a separate one of the plurality of signals to each of the first and the second color difference signals, wherein the means for producing a plurality of signals includes a first and a second switch, each switch having a movable contact and a plurality of fixed contacts, a plurality of potentiometers connected in parallel, each potentiometer having a movable contact arm connected to a separate one of the fixed switch contacts, means responsive to the third video signal for producing two signals, each representative of the third video signal but shifted one hundred and eighty degrees out of phase with each other, means responsive to the phase shifted signals for applying a signal representative of the difference of the two phase shifted signals across the parallel connected potentiometers such that the movable contact arms of the potentiometers act as voltage dividers to produce a plurality of signals of predetermined levels and polarities, means connected to the first color difference signal means and the movable contact of the first switch for combining the first color difference signal with a first one of the plurality of signals, and means connected to the second color difference signal means and the movable contact of the second switch for combining the second color difference signal with a second one of the plurality of signals.

3. A white balance control system comprising means for generating at least a first and a second color video signal, means for generating a third video signal, means for producing a first color difference signal representative of the difference between the first color video signal and the third video signal, means for producing a second color difference signal representative of the difference between the second color video signal and the third video signal, means responsive to the third video signal for producing a plurality of signals having individually predetermined polarities and levels, including potentiometric means, each having at least two, opposed input terminals and a separately connected voltage divider terminal, the resistance between the voltage divider terminal and at least one of the opposed input terminals being selectively variable, means responsive to the third video signal for producing two signals, each representative of the third video signal but shifted one hundred and eighty degrees out of phase with each other, means responsive to the phase shifted signals for applying a signal representative of the difference of the two phase shifted signals between the input terminals of the potentiometric means such that the voltage divider terminals deliver a plurality of signals of predetermined levels and polarities, means connected to the first color difference signal means and the voltage divider terminal of a first one of the potentiometric means for combining the first color difference signal with a first one of the plurality of signals, and means connected to the second color difference signal means and the voltage divider terminal of a second one of the potentiometric means for combining the second color difference signal with a second one of the plurality of signals.

* * * * *